Oct. 7, 1947. A. B. CUMMINS ET AL 2,428,555
MANUFACTURE OF MAGNESIA INSULATION
Filed March 27, 1943
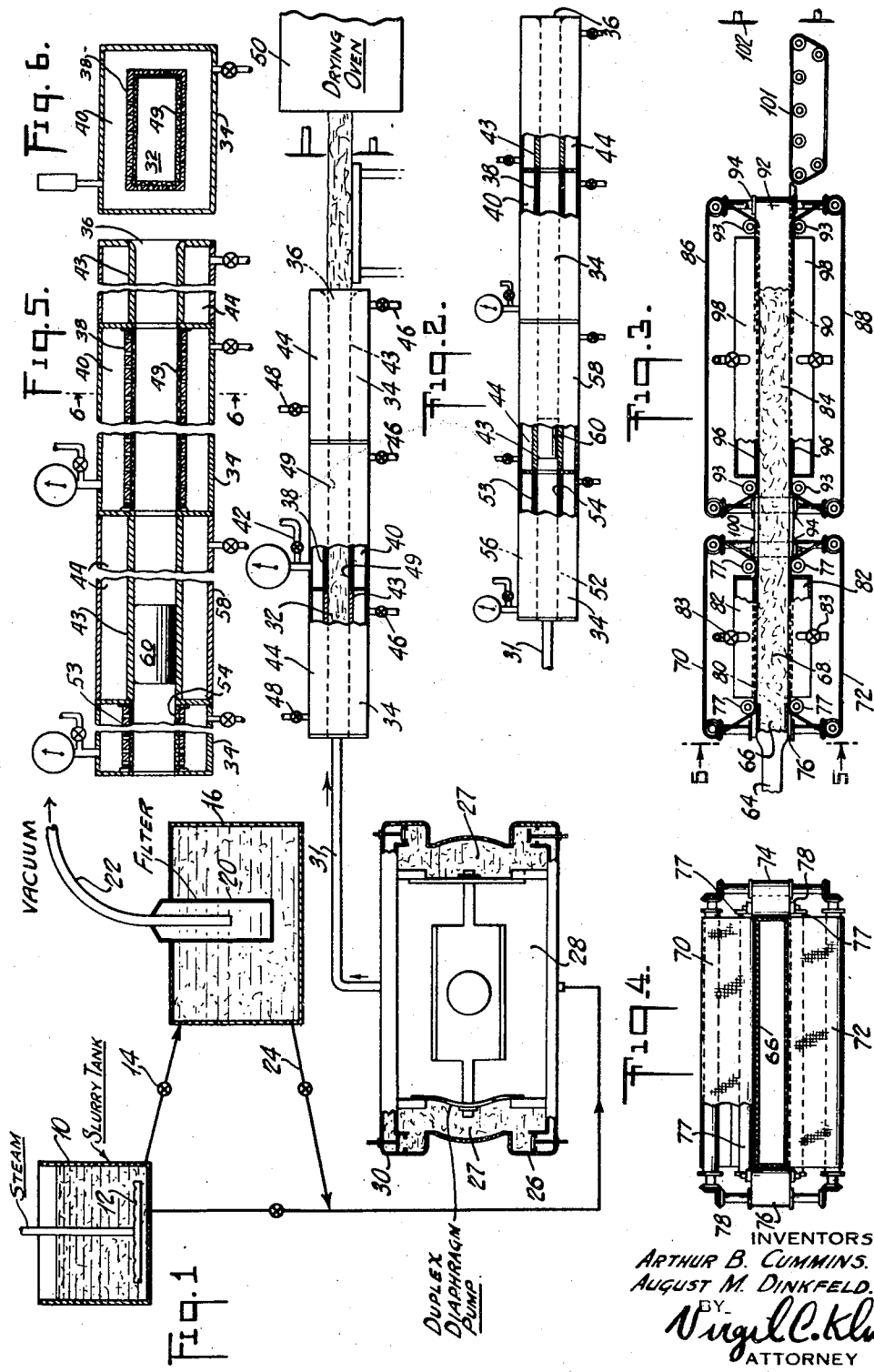
INVENTORS
ARTHUR B. CUMMINS.
AUGUST M. DINKFELD.
BY Virgil C. Kline
ATTORNEY Patented Oct. 7, 1947

2,428,555

UNITED STATES PATENT OFFICE 2,428,555

MANUFACTURE OF MAGNESIA INSULATION

Arthur B. Cummins, Plainfield, N. J., and August M. Dinkfeld, Palo Alto, Calif., assignors to Johns-Manville Corporation, New York, N. Y., a corporation of New York Application March 27, 1943, Serial No. 480,882

10 Claims. (Cl. 92—54)

This invention relates to the manufacture of magnesia insulation, and is particularly directed to improvements in method and apparatus whereby magnesia insulation blocks and other shapes may be produced by a continuous or semi-continuous extrusion operation.

Heretofore, magnesia insulation blocks and other shapes have been manufactured by intermittent or batch methods. The conventional process for making so-called "85% magnesia" has been to introduce a slurry of basic magnesium carbonate and asbestos fibers to a filtering mold under a pressure of 30-75 lbs. per square inch, thereby dewatering the slurry and forming a shaped block. After the block has thus been produced, it is removed from the mold and subjected to a drying operation. In producing magnesia insulation blocks of comparatively low density, slurries of asbestos fibers, water and normal self-setting magnesium carbonate have been molded either in open top pan molds or under low pressure in perforated filter molds. Blocks thus formed under low pressure from normal magnesium carbonate have been heat-cured to convert the normal carbonate to basic carbonate before removal from the mold, in order to impart the necessary wet strength or preliminary set.

A primary object of the present invention is to provide a continuous or semi-continuous process for forming and heat-curing magnesia insulation blocks or other shapes of suitable low density and high strength characteristics.

A more specific object of the invention is to provide method and apparatus whereby aqueous slurries of normal magnesium carbonate and asbestos may be substantially continuously charged to and advanced through dewatering, shaping and curing zones of an extrusion type forming operation in producing magnesia insulation blocks to substantially precise dimensions.

With the above and other objects and features in view, the invention resides in the improved method and apparatus for continuous or semi-continuous manufacture of magnesia insulation blocks as hereinafter described and more particularly defined by the appended claims.

In the following description, reference will be made to the accompanying drawings, in which:

Fig. 1 is a diagrammatic flow sheet arrangement of apparatus for extruding magnesia insulation in accordance with the present invention;

Fig. 2 is a view in elevation (partly in section) illustrating a modification in the extruder element of the apparatus illustrated in Fig. 1;

Fig. 3 is a view in longitudinal section of another modification of extruding apparatus having moving endless belt linings;

Fig. 4 is a view in end elevation taken on the line 4—4 of Fig. 3; and

Fig. 5 is a broken enlarged longitudinal section of the apparatus portrayed in Fig. 2; and Fig. 6 is a cross-sectional view taken on the line 6—6 of Fig. 5.

Essentially the present invention is concerned with a continuous or semi-continuous extrusion process for forming and curing magnesia insulation blocks or other shapes. After forming a slurry of below castable consistency containing normal magnesium carbonate, water and asbestos fibers, such slurry is partially dewatered to a castable consistency which may lie within the range 10%–20% solids concentration, depending upon the desired density and strength of the block which is to be produced. To shape the partially dewatered slurry a stream thereof is introduced under pressure into one end of an extruding element having a cross-section throughout its length conforming to the desired cross-section of the block to be produced. Sufficient force is applied to advance the charge at a predetermined rate through the extrusion element while applying heat to the slurry charge sufficient to initiate conversion of the normal magnesium carbonate to basic magnesium carbonate and to thereby develop a preliminary shape retaining set. After the necessary degree of preliminary set has been developed in the advancing charge, the thus-cured charge is extruded from the opposite end of the tubular extruder, and blocks or shapes may then be cut of suitable predetermined length and subjected to a final curing and drying operation in the air or steam driers.

Depending on the solids concentration of the slurry which is fed to the heat-curing section of the extruder, and on the pressure applied to the slurry charge during the shaping and curing operation in the extruder, magnesia insulation blocks may be formed having either a low density in the range 8-12 lbs. per cubic foot, or a comparatively high density in the range 12-15 lbs. per cubic foot. The molding operation in either case is preferably carried out under a low effective pressure not exceeding 25 lbs. per square inch maximum; and it is necessary that the molded blocks be given a partial heat-curing treatment sufficient to develop a preliminary set before removal from the curing section of the extruder. The resulting extruded blocks exhibit no shrinkage in volume during the curing operation. By reason of the continuous or semi-continuous flow of the charge through the extruder, the asbestos or other reinforcing fibers are oriented within the cured block in general alignment longitudinally in the direction of extrusion. In that modification of the process in which provision is made for effecting partial dewatering of the slurry within the shaping zone of the extruder, the resulting block embodies a structure including a shell of somewhat greater density than the core, with a higher concentration of fibers and of basic magnesium carbonate particles in the outside shell. Blocks or shapes can be produced by the present extrusion process having comparatively low density in the range 8–12 lbs. per cubic foot, and at the same time having a comparatively high strength or modulus of rupture above 35 lbs. per square inch.

The following specific illustrations of the method and apparatus of the present invention are given by way of example, and relate particularly to the shaping and curing of magnesia insulation blocks of generally rectangular or cylindrical shape. It will be understood, however, that the invention is generally applicable to the continuous or semi-continuous extrusion shaping and curing of other structural shapes, such as tubular shapes; and it should be understood that whereas asbestos fibers are employed as reinforcing fillers in the specific examples hereinafter given, other fillers may be substituted, as for example diatomaceous silica and mineral wool.

The first step in the process is that of preparing an aqueous slurry suspension of castable consistency for introduction to the extruder element. For this purpose a dilute aqueous suspension of finely-divided hydrated magnesia may be carbonated under conditions to produce normal magnesium carbonate ($MgCO_3.3H_2O$) directly, or else a solution of magnesium bicarbonate may be heated under conditions to produce the normal carbonate. Asbestos fibers (for example Amosite fibers) may be added to the hydrated magnesia, or bicarbonate, before the treatment converting to normal carbonate, or the asbestos may be added after formation of the normal carbonate slurry. The asbestos is normally added in amount corresponding to approximately 8%–15% by weight of the magnesium carbonate, calculated as basic magnesium carbonate. The slurry thus formed may then be dewatered and adjusted to a suitable consistency, as by filtration or decantation. In preparing the slurry, the conditions under which magnesium carbonate is formed should be such as to convert at least a substantial proportion of the magnesia content to normal or hydrated self-setting magnesium carbonate.

According to the simplest form of the process of the invention as it is illustrated in Fig. 1, a slurry of below castable consistency, containing for example 5%–6% solids concentration, is formed in or introduced to charging tank 10, in which it is maintained under a suitable temperature and degree of agitation, as by means of steam injection agitator jets 12. To adjust the slurry to a castable consistency of for example 10%–18% solids, a charge thereof is withdrawn from the bottom of tank 10 past a valve 14 into a dewatering chamber 16. In chamber 16 partial dewatering may be effected by removal of water through a vacuum filter 20, and withdrawal of filtrate water through a suction pipe 22. Slurry thus concentrated within the chamber 16 to a suitable castable consistency (for example 15%–18%) is withdrawn from the chamber through a pipe 24 past check valves 26 into one of the cylinders 27 of a diaphragm or sludge pump 28, during the suction stroke of the pump; and during the following pressure stroke of the pump the concentrated slurry is introduced past another check valve 30 into feed pipe 31 and thence into the bore 32 of an extruder 34. By continuous operation of the pump 28, the slurry thus introduced to the bore of extruder 34 is maintained under a low pressure (for example 10–15 lbs. gauge) during the period of sojourn of the slurry charge within the extruder and during the period required to bring about a preliminary set of the charge adjacent the discharge end 36 of the extruder by at least partial conversion of the normal magnesium carbonate to basic magnesium carbonate.

In order that the preliminary curing operation may be carried out within the extruder 34 within a very short period of time, it is advantageous to provide at least one section of the bore 32 with perforate walls 38 in order to provide direct communication between the charge material within the bore and a steam or hot water jacket 40 surrounding the walls 38. These perforations within the walls 38 of the bore 32 are effective in increasing the rate of heat transfer to the charge from the steam or hot water circulating within jacket 40, and also permit escape through valved pipe 42 of any excess water of hydration from the mold charge, as well as escape of carbon dioxide liberated during the heat-conversion of the normal carbonate to basic carbonate. Imperforate wall sections 43 of the extruder bore are jacketed by jackets 44. Steam or hot water may be introduced to jackets 40 and 44 by valve controlled feed pipes 46, and removed therefrom under controlled back pressure by valved pipes 42 and 48. A suitable design for the extruder 34 includes side walls of the bore 32 representing at least 25% of the bore wall area perforated and preferably provided with canvas or other fine mesh textile or wire screen filter covering or lining 49 whereby to make it possible to liberate water and gas from the extruder charge without substantial loss of slurry solids under the relatively low pressure at which the charging and curing operations are carried out. Hydrostatic or pump pressure is maintained on the extruder charge throughout the period of charging and advance of the charge throughout the length of the extruder. The effective pressure on the charge may be varied by adjusting the back pressure maintained on the hot water or steam within jacket 40. The effective pressure thus employed during the shaping and curing operation is one of the important factors of the present invention, and must apparently be limited within the range 5–25 lbs. gauge, and preferably within the more limited range of 10–20 lbs. gauge, in order to produce a product of suitable low density and high strength characteristics.

The steam or hot water which is circulated in the jacket 40 is preferably supplied and maintained at a suitable curing temperature, and under a pressure approximating 5–10 lbs. gauge. The steam or water thus supplied functions as a source of curing heat, and also as a fluid heat conveying medium for transferring the heat into direct contact with the mold charge of self-setting magnesium carbonate. In this way the necessary amount of set is imparted at least to the outer shell of the shaped charge within a comparatively brief period of a few minutes (say 5 minutes). The thus formed and partially cured block or shape is rendered sufficiently self-supporting by this operation so that it can be discharged from the end orifice 36 and conveyed to the usual air-drying oven 50 for final cure at a temperature of 170° F.–300° F. By keeping the curing temperature of the shape or block within a temperature range of 170° F.–200° F. as it passes through the extruder, a block of substantial strength for a given low density is obtained within a curing period of approximately 5 minutes. By using hot water as the curing medium within the jacket 40, it is practicable to supply the necessary curing heat to the extruder charge without over-curing the outside surface of the block, and without developing any undesirable skin effect or loss of plasticity in the outside surface of the block adjacent the filter lining 49. A block thus cured with water has been found under certain conditions to offer less difficulty in continuous extrusion movement through the extruder after partial curing, because of less tendency to stick to the walls of the extruder bore.

The water which is originally present in the charge, and the water which is liberated during the preliminary set, apparently functions as a lubricant to facilitate passage of the shaped charge through the shaping and curing zones of the extruder bore.

As a further means of reducing any tendency of the block or shape undergoing cure to stick to the walls of the extruder bore during the extrusion curing operation, the perforate bore walls 38 and fabric or screen liners 49 may be replaced in part or completely by imperforate bore liners 43 of smooth stainless steel. When the bore of the extruder is thus completely lined with imperforate metal walls, there is some advantage in incorporating in the slurry feed approximately 10% by weight of the slurry solids of finely-divided magnesium oxide. The magnesium oxide, when present in the slurry, reacts with any excess water and with carbon dioxide liberated by the reaction forming basic carbonate, to form additional basic carbonate. Thus the final structure of the extruded block is not weakened by the presence therein of free or uncombined moisture and carbon dioxide gas. When operating with completely imperforate lining for the curing section of the extruder, the extruder length must be increased, or else the steam or hot water circulated in the jackets 44 of the extruder must have a higher temperature, in order to complete satisfactory cure and preliminary set within a predetermined time limit in which transfer of heat to the block undergoing cure is solely by indirect heat transfer through the imperforate walls of the extruder bore.

That modification of the apparatus which is illustrated in Fig. 2 was particularly designed for either continuous or semi-continuous operation to produce a comparatively low density block or shape having higher concentration of fiber in its outer shell as compared to its core. For this purpose the extruder 34 is provided at its feed or inlet end with a jacketed dewatering section 52. Throughout the length of the dewatering section 52 the walls 53 of the bore are perforated and preferably lined with canvas or other fabric or fine wire mesh screen 54.

In operating this type of extruder, the slurry which is delivered by the pump 28 directly from supply tank 10 (by-passing chamber 16) to the inlet or feed end of the extruder, is below castable consistency, and preferably has a solids concentration of 5%–6%. It is desirable to maintain the slurry under an effective dewatering pressure not substantially exceeding 5 lbs. gauge while the slurry is traversing the dewatering section 52. Since a pressure greater than 5 lbs. is necessary for developing continuous movement of the slurry charge and formed block resulting from the setting thereof through the length of the extruder, the dewatering section 52 is provided with a jacket 56 within which water is circulated under sufficient pressure to maintain a pressure differential of approximately 5 lbs. between the slurry charge within the bore, and the water in jacket 56, while employing a pressure of as much as 25 lbs. on the slurry feed to the extruder bore. The dewatering section 52 will have a length substantially greater than the length of any block which it is desired to form within the extruder. Interposed between dewatering section 52 and the curing section of the extruder is a jacketed section 58 within which the extruder bore has imperforate walls 43. Section 58 may perform the function of preheating, within which the temperature of the dewatered slurry is raised to approximately curing temperature by indirect heat transfer through the walls thereof, by heat supplied by circulation of steam or other heating fluid within a jacket 44. The curing section of the apparatus illustrated in Fig. 2 may be made up of alternately positioned extruder segments, at least one of which is provided with perforate linings 38, while others are provided with imperforate linings 43. The section 58 between the dewatering unit and curing unit has the additional function of an impervious packing preventing transference of jacketing fluid between two sections of the extruder having perforate bore linings.

While the apparatus illustrated in Figs. 1 and 2 was designed particularly for operation as a continuous extruder in which there is continuous slow advance of the slurry charge through the dewatering and curing sections, with continuous discharge of a set block from the delivery end 36, it has been found to be sometimes advantageous to operate this apparatus on a discontinuous or semi-continuous cycle. This discontinuous operating cycle as practiced in the apparatus of Fig. 2, consists essentially in molding a charge of slurry held substantially stationary within the dewatering section 52, while raising the consistency thereof up to castable consistency by partial dewatering; then advancing the thus dewatered charge intermittently in stages through the curing sections at a rate suitable for effecting dewatering of following sections of the slurry charge to castable consistency. According to this method of operation, back pressures are maintained on the fluid circulating in the jackets 56 and 40 surrounding the perforate walled sections of the extruder bore such as to hold an effective pressure of not substantially exceeding 5 lbs. within the dewatering section, and similar low effective pressures within perforate walled zones of the curing section of the extruder.

When commencing operation on this cycle, a wooden block or flexible rubber plug 60 is inserted from the discharge end of the extruder up to the end of the dewatering section, where it is held until the dewatering of the preliminary charge is effected, and this block is then gradually withdrawn toward the discharge end 36, until the forward end of the advancing charge column has been hardened and set to a point where it can function as a liquid retaining block for the charge.

By thus gradually and intermittently advancing the slurry charge in increments of, for example, 6–12 inch length, it is possible to dewater a slurry of 5% initial solids concentration up to a castable concentration of, for example, 13% solids, and to thereafter effect a preliminary heat cure and self supporting set, within a period of say 15 to 20 minutes of elapsed time between the time of first introduction of a slurry increment to the extruder and the time of discharge of that increment as a solid block from the extruder delivery end 36.

When a perforate dewatering section 52 is provided at the inlet end of the extruder, satisfactory blocks can be produced while using an imperforate lining for the curing end of the extruder. However, when the bore lining for the curing end of the extruder is provided with imperforate smooth metal walls which are steam jacketed, it is usually desirable to incorporate a small amount of magnesium oxide in the slurry charge for the purpose of insuring greater uniformity of structure and strength in the extruded blocks produced by the treatment.

Figs. 3 and 4 illustrate another modification of the apparatus having as its principal design feature the utilization of friction contact between the solid content of the magnesia slurry and continuously moving straight sections of endless fabric or wire screen conveyors forming the walls of the extruder bore, whereby to positively advance the slurry solids through the shaping and curing zones of the extruder while avoiding the use of relatively high pressure to feed the slurry to the charging end of the extruder. The apparatus provided for this modification includes a feed pipe 64 and a distributor 66 for delivering slurry of below castable consistency from the discharge ports of pump 28 to the feed end of a dewatering section 68 of the extruder. The walls of extruder section 68 consists of edge abutting straight sections of synchronously driven pervious belt conveyors 70, 72, 74 and 76.

Straight sections of conveyors 70 and 72 form respectively the top and bottom walls of the dewatering and shaping zone, while straight sections of conveyors 74 and 76 form respectively the opposite parallel side walls of the extruder section 68. The pervious fabric conveyor walls of the extruder section 68 are supported and retained in substantially edge abutting non-deformable relation by rolls 77 and 78 and by perforate supporting and backing plates 80. Plates 80 are shown as forming perforate walls of otherwise imperforate drainage boxes 82. Each drainage box 82 is provided with a connection 83 whereby to develop a pressure differential sufficient to facilitate partial dewatering of the slurry charge through the fabric walls of section 68 and through the perforate plates 80 while shaping and positively advancing the charge therethrough by the synchronized movement of the wall sections.

Axially aligned with the dewatering and shaping section 68 of the extruder there is mounted an extruder curing section 84 matching in its cross-sectional dimensions the cross-sectional dimensions of section 68 and of greater length than section 68. The walls of curing section 84 are formed by straight sections of pervious fabric endless belt conveyors 86, 88, 90 and 92 mounted in edge abutting relation similarly to the conveyor walls of section 68. Each of the walls of the curing section 84 is supported and retained in non-deformable position by rolls 93 and 94 and by perforate supporting plates 96. Plates 96 in turn form perforate walls of heating jackets 98 within which steam or hot water may be circulated at a rate and under a temperature sufficient to develop a preliminary shape retaining set in a shaped charge which is advanced through the bore of curing section 84 by friction contact with the moving conveyor walls.

The apparatus which is illustrated in Figs. 3 and 4 operates without difficulty from clogging, and it is possible to move a charge continuously through the dewatering, shaping and curing sections of the extruder without having to use high slurry feeding pressures. The moving conveyor side walls of the extruder function to forcibly advance the solids content of the slurry feed successively through the dewatering and curing sections at a rate which is regulated in accordance with the rate of charging by the slurry feed pump but independent of the pressures developed thereby.

In operation, a slurry of below castable consistency may be pumped directly from charging tank 10 to the inlet end of section 68 of the extruder. The slurry is dewatered and the solids content thereof is shaped to the cross-sectional dimensions of section 68 as the charge is advanced therethrough by the moving pervious side walls thereof. The rate of dewatering may be controlled by maintaining a controlled pressure drop between the bore of the shaping zone and drainage boxes 82. Excess water thus removed from the slurry may be discharged from boxes 82 through valved drainpipes 83. After any increment of the charge has passed the dewatering and curing section 68, it is conveyed to the inlet end of the curing section 84 through a short stationary transfer section 100 having imperforate walls. The transfer section 100 of the extruder preferably has a length only sufficient to effect transfer of the formed slurry solid shapes without injury or deformation between the discharge end of the shaping section 68 and the inlet end of the curing section 84, under the propulsion force impressed on the charge by friction contact with the conveyor walls of the extruder shaping and curing sections. While advancing through the curing section of the extruder a partial cure and preliminary set of the formed blocks is effected by direct heat transfer with steam or hot water circulating through jackets 98, preferably at a temperature of 170°–200° F. Care is taken to synchronize and control the speeds of the conveyors 86, 88, 90 and 92 so as to exert no substantial tension or torsional strain on the charge which is fed to the curing zone from the dewatering and transition elements of the extruder. After the preliminary set has been imparted, the blocks are discharged from the extruder onto a conveyor platform 101. The partially set and precisely dimensioned product thus discharged on platform 101 may be cut by saws 102 to blocks of desired length, and these blocks can then be dried and their cure completed by passing through a drying oven.

It will be appreciated that various modifications of the process and apparatus are contemplated. For example, a slurry charge of below castable consistency may be continuously dewatered and shaped in a stationary pervious walled extruder element such as 52 of Fig. 2, and the thus shaped product may then be cured to a preliminary set within an extruder curing section having continuously moving fabric lined walls, such as the section 84 of Fig. 3. Moreover, a slurry charge of below castable consistency may be dewatered to castable consistency in a filter chamber such as element 16 of Fig. 1, and may thereafter be shaped and cured in an extruder provided with continuously moving fabric lined and heat jacketed walls, such as the element 84 of Fig. 3. By the various process and apparatus modifications which have been hereinbefore referred to, it is possible to overcome the difficult problem of effecting semi-continuous or continuous dewatering, shaping and curing of self-setting magnesium insulation of extremely low density and comparatively fragile structure in a practical and efficient operation.

Since many variations may be made from the illustrative details given, without departing from the scope of the invention, it is intended that the invention should be limited only by the terms of the claims interpreted as broadly as consistent with novelty over the prior art.

What we claim is:

1. A substantially continuous process for producing magnesia insulation blocks comprising, forming a slurry of below castable consistency containing normal magnesium carbonate, water and reinforcing fibers, partially dewatering said slurry to castable consistency and shaping the slurry solids to the cross-sectional dimensions of the desired block while advancing the charge solids through an extruder bore, and heat curing the wet solids block thus formed to develop a preliminary shape retaining set while advancing the wet solids block through an extruder bore extension.

2. In manufacturing magnesia insulation blocks the steps comprising, forming a slurry of below castable consistency comprising normal magnesium carbonate, water and asbestos fibers, delivering said slurry to the feed end of an extruder under a pressure in the range 10-25 lbs. gauge, partially dewatering and shaping the slurry solids within the feed end of the extruder while holding a back pressure against release of water sufficient to maintain an effective dewatering pressure of approximately 5 lbs. gauge, advancing the partially dewatered and shaped charge through the extruder, heating the charge advancing through the extruder to a temperature adapted to convert the normal carbonate to basic carbonate and to develop a preliminary shape retaining set, and discharging the shaped and set product by extrusion under the applied feed pressure.

3. Apparatus for continuously forming and curing magnesia insulation blocks comprising, an extruder having a bore which is dimensioned to match the cross-sectional dimensions of the blocks to be produced, a heating jacket enclosing said bore, means for circulating a heating fluid through said jacket, means for supplying an aqueous slurry charge of normal magnesium carbonate crystals and asbestos fibers, means for shaping said slurry charge to the cross-sectional dimensions of the extruder bore, and means for forcibly advancing the shaped charge through said bore at a rate controlled to effect a preliminary shape retaining set of the charge during its period of sojourn in the bore, said bore having perforations arranged to bring the heating fluid circulating in the jacket in direct contact with the charge undergoing heat cure as it advances through the bore.

4. Apparatus for continuously forming and curing magnesia insulation blocks comprising, an extruder having a bore which is dimensioned to match the cross-sectional dimensions of the blocks to be produced, a heating jacket enclosing said bore, means for circulating a heating fluid through said jacket, means for supplying an aqueous slurry charge of normal magnesium carbonate crystals and asbestos fibers of castable consistency, means for shaping said slurry charge to the cross-sectional dimensions of the extruder bore, the walls of the extruder bore comprising straight sections of pervious endless belt conveyors which are operative for forcibly advancing the shaped charge through the bore at a rate controlled to effect a preliminary shape retaining set of the charge during its period of sojourn in the bore.

5. A substantially continuous process for forming magnesia insulation blocks comprising, pressure filter molding a dilute aqueous slurry charge comprising normal magnesium carbonate and asbestos fibers, partially dewatering and shaping the wet slurry solids to block form during the molding operation, repeating the molding operation on a fresh charge while advancing the wet molded block away from the mold, heat curing the advancing block to develop a preliminary shape retaining set by contacting hot water at curing temperature directly therewith, confining the block while releasing carbon dioxide therefrom during the curing step, and finally drying the block at an elevated temperature to complete conversion of normal carbonate to basic carbonate.

6. In manufacturing magnesia insulation blocks the steps comprising, forming a slurry of below castable consistency comprising normal magnesium carbonate, water and asbestos fibers, partially dewatering and shaping a charge of the wet slurry solids to block form by a pressure filter molding operation thereon, advancing the thus formed charge through an extruder, applying heat to the charge advancing through the extruder by contacting aqueous heating fluid therewith at a temperature sufficient to partially convert the normal carbonate to basic carbonate and to develop a preliminary shape retaining set, and drying the extruded set block at an elevated temperature to complete conversion of normal carbonate to basic carbonate.

7. In manufacturing magnesia insulation blocks the steps comprising, forming a slurry of below castable consistency comprising normal magnesium carbonate, water and asbestos fibers, partially dewatering and shaping a charge of the wet slurry solids to block form by a pressure filter molding operation thereon, removing the block from the molding unit, heat curing the wet molded block by contacting aqueous heating fluid therewith to partially convert the normal carbonate to basic carbonate and to develop a preliminary shape retaining set, and drying the block at an elevated temperature to complete conversion of normal carbonate to basic carbonate.

8. Apparatus for forming and curing magnesia insulation blocks comprising, means for supplying a dilute aqueous slurry charge containing normal magnesium carbonate crystals and asbestos fibers, a pressure filter molding unit arranged to receive said charge and to partially dewater and shape the solids content thereof to a block having the desired cross-sectional dimensions, a heat curing unit mounted in alignment with and adjacent the molding unit in position to receive and advance molded blocks discharged therefrom, opposite walls of said curing unit comprising water pervious and solids impervious spaced parallel sections of a pair of endless belt conveyors, the spacing between said parallel conveyor sections equalling a cross-sectional dimension of the block, a container for maintaining a heating fluid source of curing heat in contact with the pervious walls of said curing unit and the molded block, and a drying chamber mounted in a position to receive cured blocks discharged from the curing unit.

9. A substantially continuous process for forming magnesia insulation blocks comprising, forming an aqueous slurry of castable consistency comprising normal magnesium carbonate and reinforcing fibers, shaping a charge of said slurry to the cross-sectional dimensions of the desired block, and initiating heat conversion of the normal magnesium carbonate to basic magnesium carbonate thereby to develop a preliminary shape retaining set by maintaining hot water in direct heat transfer contact with the shaped charge while extruding the charge through an extruder bore having the cross-sectional dimensions of the desired block.

10. A substantially continuous process for producing magnesia insulation blocks comprising, forming a slurry of below castable consistency containing normal magnesium carbonate, water and reinforcing fibers, partially dewatering said slurry to castable consistency and shaping the slurry solids to the cross-sectional dimensions of the desired block while advancing the charge solids under controlled feed pressure through an extruder bore, holding a controlled back pressure to limit the effective dewatering pressure, and heat curing the wet solids block thus formed to develop a preliminary shape retaining set while advancing the wet solids block through an extruder bore extension.

ARTHUR B. CUMMINS.
AUGUST M. DINKFELD.

REFERENCES CITED

The following references are of record in the file of this patent:

UNITED STATES PATENTS

| Number | Name | Date |
|---|---|---|
| 2,275,032 | Grieder et al. | Mar. 3, 1942 |
| 2,209,752 | Abrahams | July 30, 1940 |
| 1,273,527 | Norris | July 23, 1918 |
| 2,326,517 | Brown | Aug. 10, 1943 |
| 531,478 | Stauber | Dec. 25, 1894 |
| 2,028,952 | Reimer | Jan. 28, 1936 |
| 1,908,689 | Carpenter | May 16, 1933 |
| 1,758,946 | Grupe | May 20, 1930 |

FOREIGN PATENTS

| Number | Country | Date |
|---|---|---|
| 150,321 | Germany | 1904 |
| 566,556 | Germany | Dec. 21, 1932 |
| 829,372 | France | Mar. 28, 1938 |